United States Patent
McGeorge, Jr.

(10) Patent No.: US 6,931,628 B2
(45) Date of Patent: Aug. 16, 2005

(54) MANGLED STRINGS FOR TESTING OF INTERNATIONALIZATION

(75) Inventor: Vernon E. McGeorge, Jr., San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 641 days.

(21) Appl. No.: 09/966,106

(22) Filed: Oct. 1, 2001

(65) Prior Publication Data

US 2003/0065985 A1 Apr. 3, 2003

(51) Int. Cl.⁷ ................................................. G06F 9/44
(52) U.S. Cl. .................................... 717/124; 704/8
(58) Field of Search .............................. 717/124; 704/8

(56) References Cited

U.S. PATENT DOCUMENTS

| | | | | |
|---|---|---|---|---|
| 5,416,903 A | * | 5/1995 | Malcolm | 345/703 |
| 5,778,356 A | * | 7/1998 | Heiny | 707/2 |
| 6,185,729 B1 | * | 2/2001 | Watanabe et al. | 717/100 |
| 6,275,792 B1 | * | 8/2001 | Lewis | 704/9 |
| 6,745,348 B2 | * | 6/2004 | Chung et al. | 714/47 |

OTHER PUBLICATIONS

Linkers & Loaders, John Levine, published Oct. 11, 1999, Morgan Kaufman Publishers, pp. 117–129.*

IBM Graphical Locale Builder, Steve Atkin et al, IBM, Apr. 1998, pp. 1–8.*

Adapt Your Program for Worldwide Use with Windows Internationalization Support, William S. Hall, Nov. 1991, Microsoft System Journal, v6, n6, 14 pages.*

* cited by examiner

Primary Examiner—Todd Ingberg

(57) ABSTRACT

A method for testing internationalization in a program under development includes determining whether a command contains a test switch, which initiates the internationalization testing and displaying a character string being tested in a first format when the command contains the test switch.

17 Claims, 4 Drawing Sheets

US 6,931,628 B2

MANGLED STRINGS FOR TESTING OF INTERNATIONALIZATION

BACKGROUND OF THE INVENTION

This invention relates generally to troubleshooting program code, and more specifically to methods and apparatus for determining whether a program under development outputs or displays character strings that are not translated for users who speak other languages.

In today's international market, computer programs are often sold to consumers in various countries and locales. As a result, the language understood by programmers, and thus the language in which various character string values are expressed in the program, is often not the same as the language understood by the consumers who will be using the program. Therefore, it is useful to have some method to translate the character string values in the program into a variety of languages such that consumers can readily understand and utilize the program despite language barriers. This process of translating character string values in programs is called internationalization.

One method of performing internationalization of character string variables in a program uses message keys and message catalogues. Rather than being hard-coded, character string variables in the program are identified by message keys. These message keys reference a particular localized message catalogue, which contain every character string value used in the program in a specific language. The message catalogues are typically created in a specific country by native speakers. A single program can contain many message catalogues, each corresponding a different consumer language.

In order to insure that every character string value in the program is properly internationalized such that they contain a message key and properly reference a message catalogue, rather than simply being hard-coded, and thus language invariant, the program developer has to painstakingly inspect each and every character string value that may appear in the program code. This inspection method, however, has the disadvantage of being tedious, time consuming, and error prone.

Program internationalization can also be tested by post-localization testing during which localization engineers, who develop the message catalogues, test their translations by running the program and making sure the character string variables are expressed in the appropriate language. As a side effect of this testing, the localization engineers can also detect and report improperly internationalized character strings, character strings that always appear in the program developer's language, to the development team. This method, however, has the disadvantage of coming late in the development cycle, perhaps even after the program has been released into the consumer market.

What is needed is a method of testing internationalization that is less tedious for the program developer and can be performed at any point during the development process.

BRIEF SUMMARY OF THE INVENTION

The method and system described herein are advantageous in that they overcome the above problems by allowing the program developer to more readily identify incorrectly internationalized character strings. Another advantage of the method and system described herein is that testing for proper internationalization of character strings can be done at any time during the program development process.

These and other advantages are achieved in a system for internationalization testing of a program under development, which includes an input device, a processor, an output device, a first memory to store the program, a second memory to store at least one message catalogue, and a third memory that includes modules to control the processor. One module determines whether a command from a tester of the program contains a test switch therein. The test switch initiates the internationalization testing of the program. Another module displays to the tester a character string being tested within the program in a first format after receipt of the test switch when the command contains the test switch. The input device allows a user to input the command containing the test switch for initializing a testing code. The output device displays the character string being tested in the first format. The at least one message catalogue contains a plurality of localized character strings.

These and other advantages are further achieved in a method for internationalization testing of a program under development. The method includes a step of determining whether a command from a tester of the program contains a test switch therein. The test switch initiates the internationalization testing of the program. The method further includes a step of displaying to the tester a character string being tested within the program in a first format after receipt of the test switch when the command contains the test switch.

BRIEF DESCRIPTION OF THE DRAWINGS

The invention will be described, by way of example, in the description of exemplary embodiments, with particular reference to the accompanying drawings, in which like reference numbers refer to like elements and in which.

DETAILED DESCRIPTION OF THE INVENTION

Figure 1:
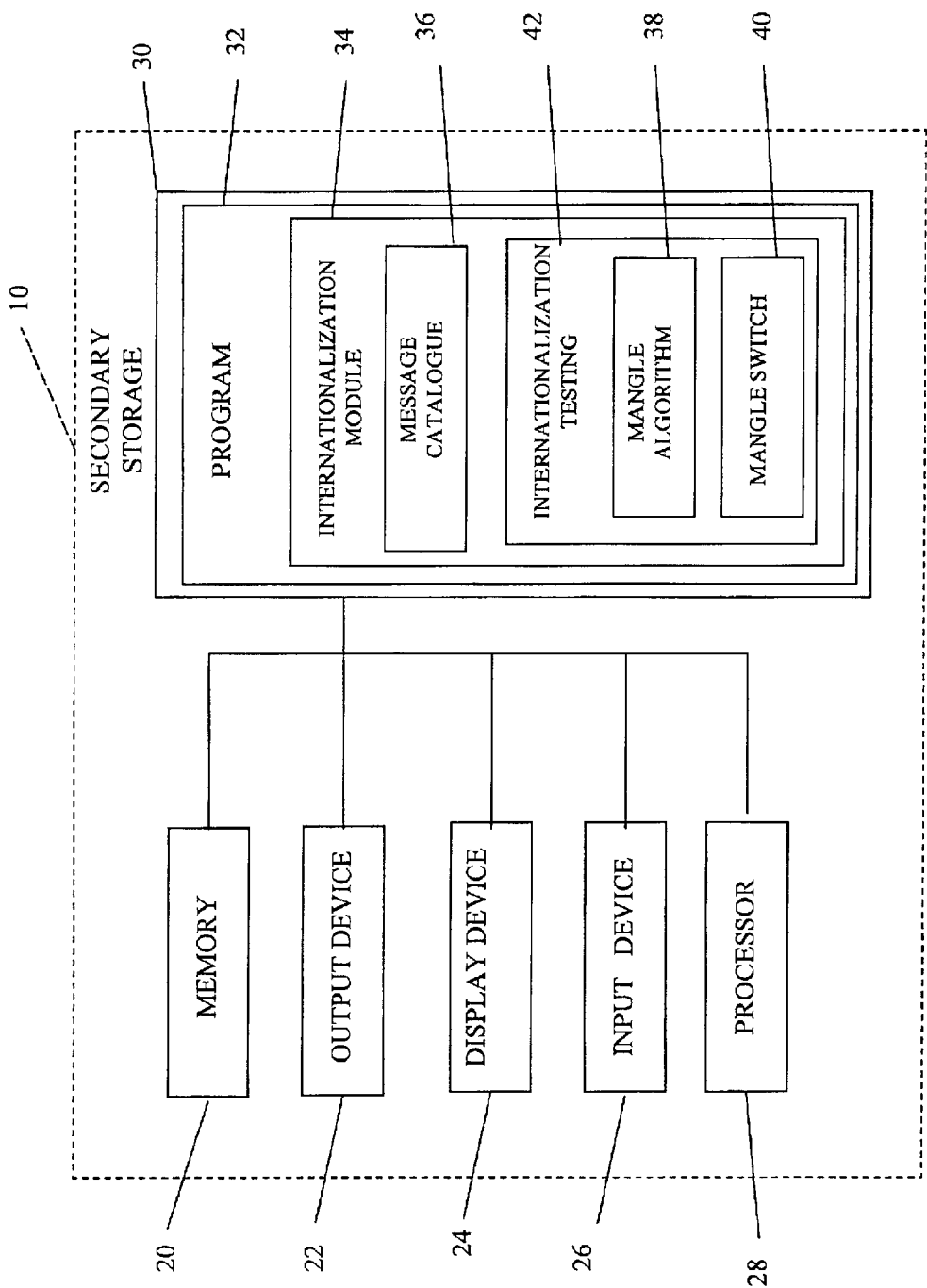
FIG. 1 is a block diagram of a preferred embodiment of a computer system for implementing the present invention.

FIG. 1 is a block diagram illustrating a preferred embodiment of a computer system 10 upon which the method described herein may be implemented. Computer system 10 typically includes a memory 20, an output device 22, a display device 24, an input device 26, a processor 28, and a secondary storage device 30. Memory 20 may include random access memory (RAM) or similar types of memory. Secondary storage device 30 may include a hard disk drive, floppy disk drive, CD-ROM drive, or other types of non-volatile data storage.

Secondary storage device 30 may also store one or more program(s) 32, which may be under development. Program(s) 32 may further store a module 34, containing instructions for internationalizing character strings in the program(s) 32 and which also preferably includes message catalogue(s) 36, containing a plurality of localized character strings and modules 42, containing instructions for testing internationalization of the program(s) 32 under development according to the method described herein. Program(s) 32 may also store, preferably within internationalization testing module 42, a module 38 containing instructions for displaying the internationalized character strings in a modified format. Program(s) may further store, within internationalization testing module 42, a mangle switch value 40 that indicates whether a command from the program developer includes a test switch that initiates the internationalization testing of the program(s) 32 under development. Alternatively, the program(s) 32, the message catalogue(s) 36, the mangle switch value 40 and the various modules described above may be stored in memory 20.

Processor 28 executes a program selected from the program(s) 32, which preferably includes the internationalization testing module 42 and the internationalization module 34, stored in memory 20 or secondary storage device 30. Processor 28 also executes the mangle algorithm module 38. Input device 26 may include any device for entering information into computer system 10, such as a keyboard, mouse, cursor-control device, touch-screen, infrared, microphone, digital camera, video recorder, or camcorder. Display device 24 may include any type of device for presenting visual information such as, for example, a computer monitor or flat-screen display. Output device 22 may include any type of device for presenting a hard copy of information, such as a printer, and other types of output devices including speakers or any device for providing information in audio form.

Computer system 10 may be any type of user machine for executing the program(s) 32, the internationalization testing module 42, the internationalization module 34, and the mangle algorithm module 38, including personal computers, laptop computers, notebook computers, palm top computers, network computers, or any processor-controlled device capable of executing the program(s) 32, the internationalization testing module 42, the internationalization module 34, and the mangle algorithm module 38.

Figure 2:
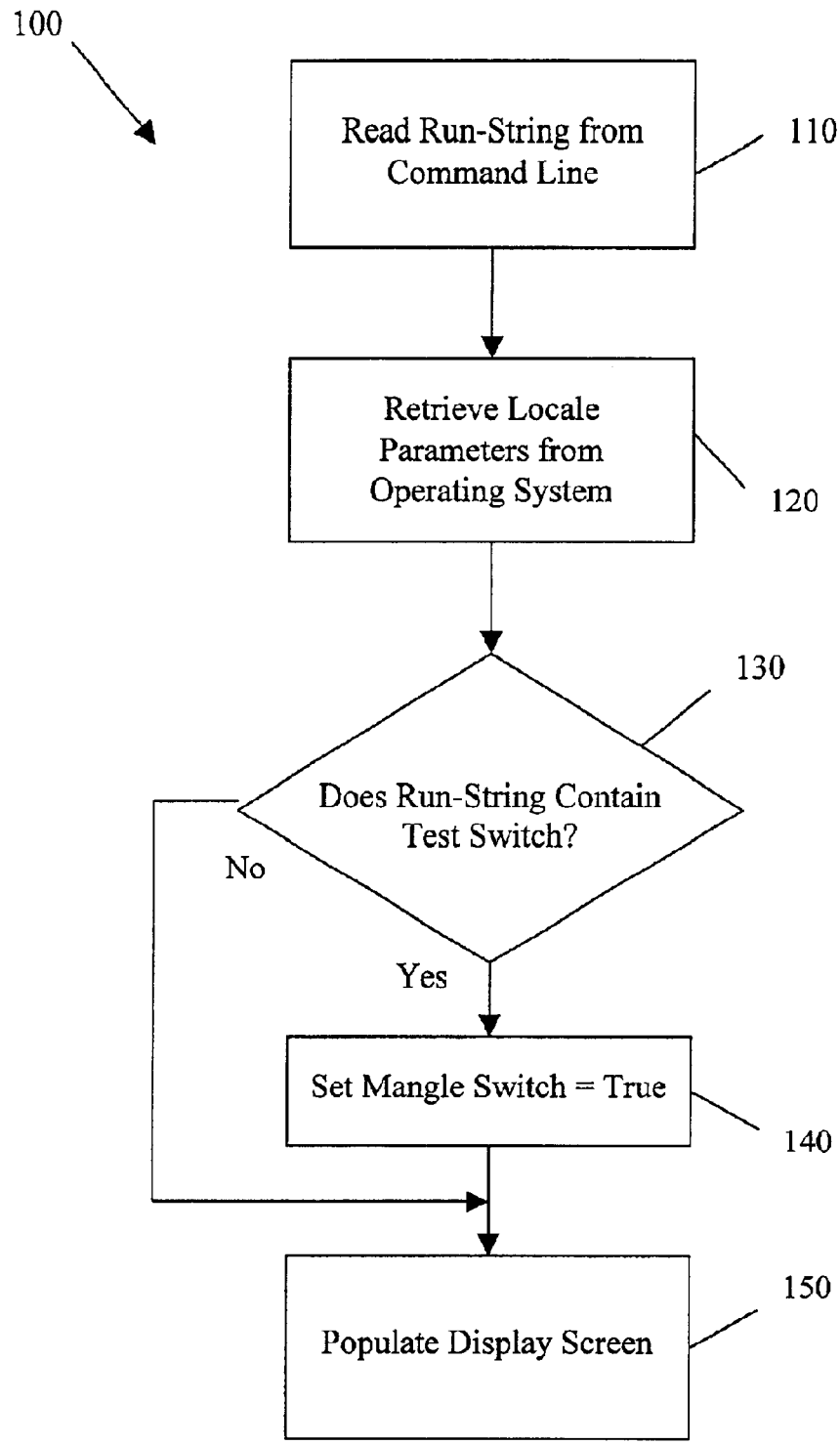
FIG. 2 is a flowchart of a preferred method for performing internationalization testing of a program under development.

FIG. 2 is a flowchart of a preferred method for performing internationalization testing of a program 32 under development, denoted generally by reference numeral 100. Internationalization testing method 100 includes reading, at step 110, a run-string from a command line and retrieving, at step 120, locale parameter from an operating system of the computer system 10. Internationalization testing method 100 also includes determining, at step 130, whether the run-string contains a test switch, which initiates internationalization testing of character strings within the program 32 under development. Internationalization testing method 100 further includes setting, at step 140, the mangle switch value 40 to "true" if the run-string does contain the test switch. Internationalization testing method then populates, at step 150, a display screen according to the program 32 under development with the formatting of the character strings depending on whether the internationalization of the character strings is being tested.

Reading, at step 110, the run-string from the command line includes the program developer, or whomever is executing the program 32 under development, entering the run-string into the command line, e.g., a DOS prompt, using input device 26 and the processor 28 interpreting the instructions contained in the run-string. The program(s) 32 are run using commands in the run-string, e.g., a run.bat script on a Windows™ machine or via a .exe executable command. Examples of run-strings are as follows:

run sgmgr-f file.sgm sgmgr-s noir-u user-p password

The program developer may include a test switch in the run-string command and thus initiate internationalization testing of the program 32 under development. Thus with the test switch, the run-strings would be as follows:

run-TestI18N sgmgr-TestI18N-f file.sgm sgmgr-s noir-u user-p password-TestI18N, where—TestI18N is an example of the test switch. Note that the position of the test switch is not important.

Once the program 32 has been executed with the run-string, the display device 24, on which the program 32 is displayed, is populated with characters, icons, etc. according to instructions contained in program 32. Character strings should be defined by message keys rather than being hard coded into the program 32 code such that the value of the character strings can be retrieved by the internationalization module 34 from a message catalogue 36. The purpose of internationalization testing method 100 is to allow the program developer to determine which character strings are and are not defined by message keys, thus allowing the program developer to correct any erroneously hardcoded character strings.

After reading the run-string, internationalization testing method 100 retrieves, at step 120, locale parameter from the operating system of computer system 10. The message catalogue(s) 36 contains character strings expressed in an particular language. What language, and thus which message catalogue 36, is appropriate for a user executing the program 32 on a particular computer system 10 depends on locale parameter included in the computer system 10. The locale parameter information is a characteristic of the computer system 10 and is maintained by the operating system of the computer system 10. The locale parameter is set when the system software is installed and configured. Depending on the computer system 10, the locale parameter may be changed when a user logs on to the computer system 10. For example, in Montreal, some users may have their locale parameter set to French while other users have their locale parameter set to English. In either event, the locale parameter of a particular computer system 10 is determined before the program 32 is run.

Internationalization testing method 100 then determines, at step 130, whether the run-string contains the test-switch. If the run-string contains the test-switch, the mangle switch value 40 is set to "true". The display screen is then populated, at step 150, preferably on display device 24. The step 150 of populating the display screen is described in further detail with reference to FIG. 3.

Figure 3:
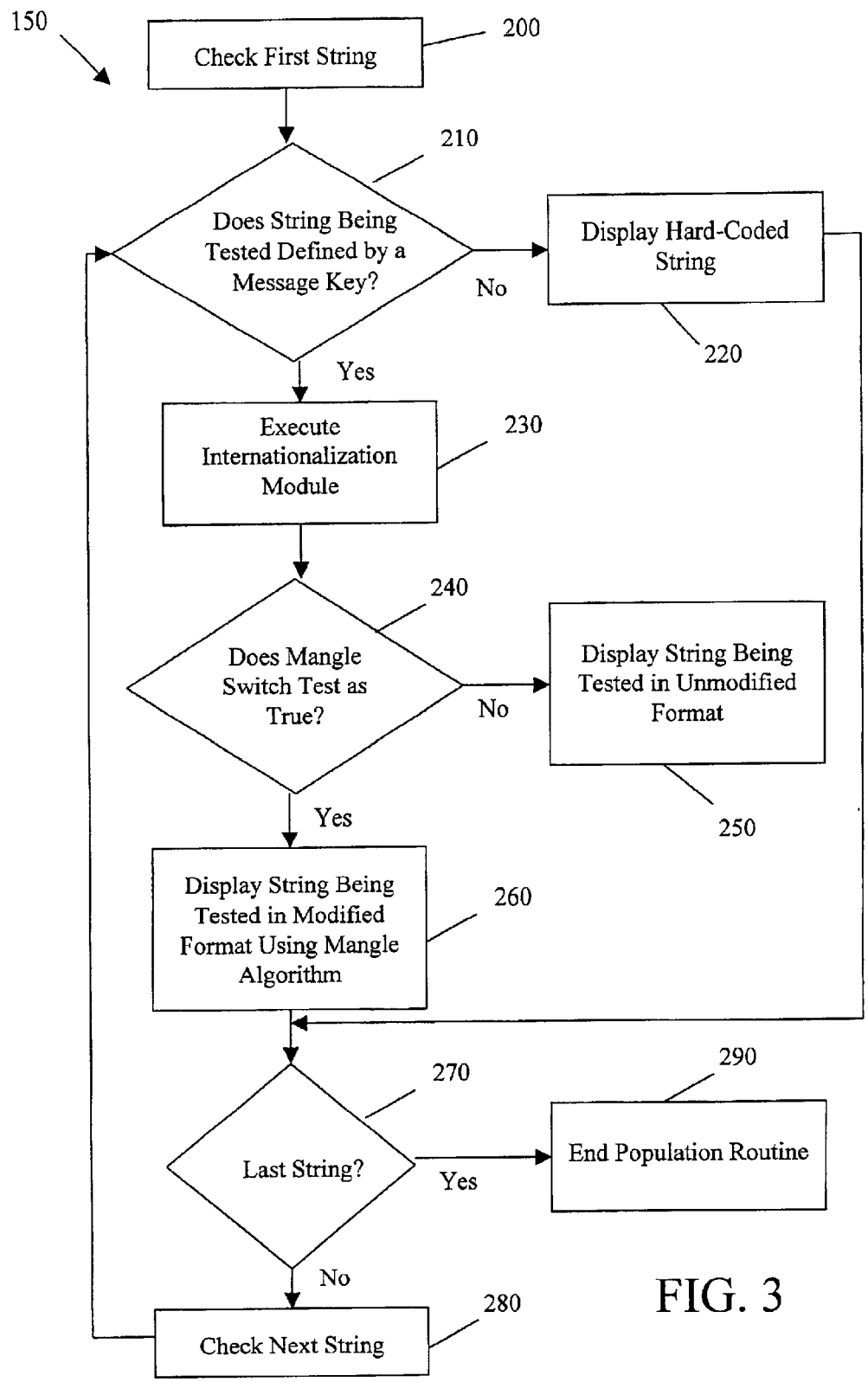
FIG. 3 is a flowchart of a preferred method for displaying character strings in the program under development to indicate whether character strings have been internationalized.

FIG. 3 is a flowchart of a preferred method for displaying character strings in the program under development to indicate whether character strings have been internationalized, denoted generally by reference numeral 150. Display method 150 includes checking, at step 200, a first character string, determining, at step 210, whether the character string being tested is defined by a message key, and displaying, at step 220, the character string as hard-coded in program 32 if it is not defined by a message key. If the character string being tested is defined by a message key, display method 150 executes, at step 230, an internationalization module 34. Display method 150 then determines, at step 240, whether the mangle switch value 40 tests as "true". If the mangle switch value 40 does not test as "true", the character string under test is displayed, at step 250, in an unmodified format. If the mangle switch value 40 does test as "true", the character string under test is displayed, at step 260, in a modified, mangled format using the mangle algorithm 38. Display method 150 then determines, at step 270, whether the character string under test is the last character string in program 32. If not, display method 150 checks, at step 280, to the next character string the program 32. If the character string just check is the last character string in the program 32, the population routine is ended, at step 290.

Display method 150 goes through the program 32 character string by character string and displays them in a format depending on whether the internationalization of the character strings is being tested and whether the character strings are in fact internationalized. Display method turns, at step 200, to the first character string in the program 32 under development and determines, at step 210, whether that character string is defined by a message key. A message key is a variable that references a particular character string value in the message catalogue(s) 36.

If the character string being tested is not defined by a message key, the character string is displayed, at step 220, as the character string has been hard-coded into the program 32. Therefore, if the character string is hard-coded as "Apple Pie" in the program 32, "Apple Pie" is what will be displayed on display device 24. If, however, the character string is defined by a message key, the value of the character string must then be retrieved from the appropriate message catalogue 36. The internationalization module 34 is executed, at step 230, to retrieve the correct character string. The internationalization module 34 uses the message key and the local parameters of the computer system 10 to retrieve the correct character string value. The operation of internationalization module is described in greater detail with reference to FIG. 4.

Once the correct character string value has been retrieved, display method 240 then determines whether the mangle switch value 40 tests as "true". As described above, the mangle switch value 40 is set to "true" if the run-string used to execute the program 32 contained the test switch. By including the test switch in the run-string, the program developer indicates that internationalization testing of the character strings in program 32 is desired. If the mangle switch value 40 does not test as true, then the run-string did not contain the test switch and internationalization testing is not being performed. Therefore, display method will display the character string as retrieved from the message catalogue 36 in an unmodified format. For example, if the character string value in the message catalogue is "Happy Birthday," then "Happy Birthday" will be displayed on display device 24.

If, however, the mangle switch value 40 does test as true, then the character string value as retrieved from the message catalogue 36 is passed to the mangle algorithm 38, which in turn modifies the character string value for display. The mangle algorithm operates by switching the case of each letter in the character string. Using the previous example, if the character string value in the message catalogue 36 is "Happy Birthday," once the character string value is passed to and returned by the mangle algorithm 38, the character string value is modified as "hAPPY bIRTHDAY." The modified character string is then displayed, at step 260, in the modified, mangled format. By thus modifying the properly internationalized character string, any character strings that are not internationalized, meaning that the character string is not defined by a message key, will clearly stand out to the program developer. The program developer can then go into the program 32 code and insure that the incorrectly hard-coded character string is defined by a message key.

Display method 150 then determines, at step 270, whether the character string that was just tested and displayed, is the last character string in the program 32. If not, the next character string chosen, at step 280, and is checked and displayed according to the method previously described. If the character string previously checked is the last character string in the program 32, display method 150 ends, at step 290. The program developer can then visually examine the populated display and determine whether any character strings are not properly internationalized and required correction.

Figure 4:
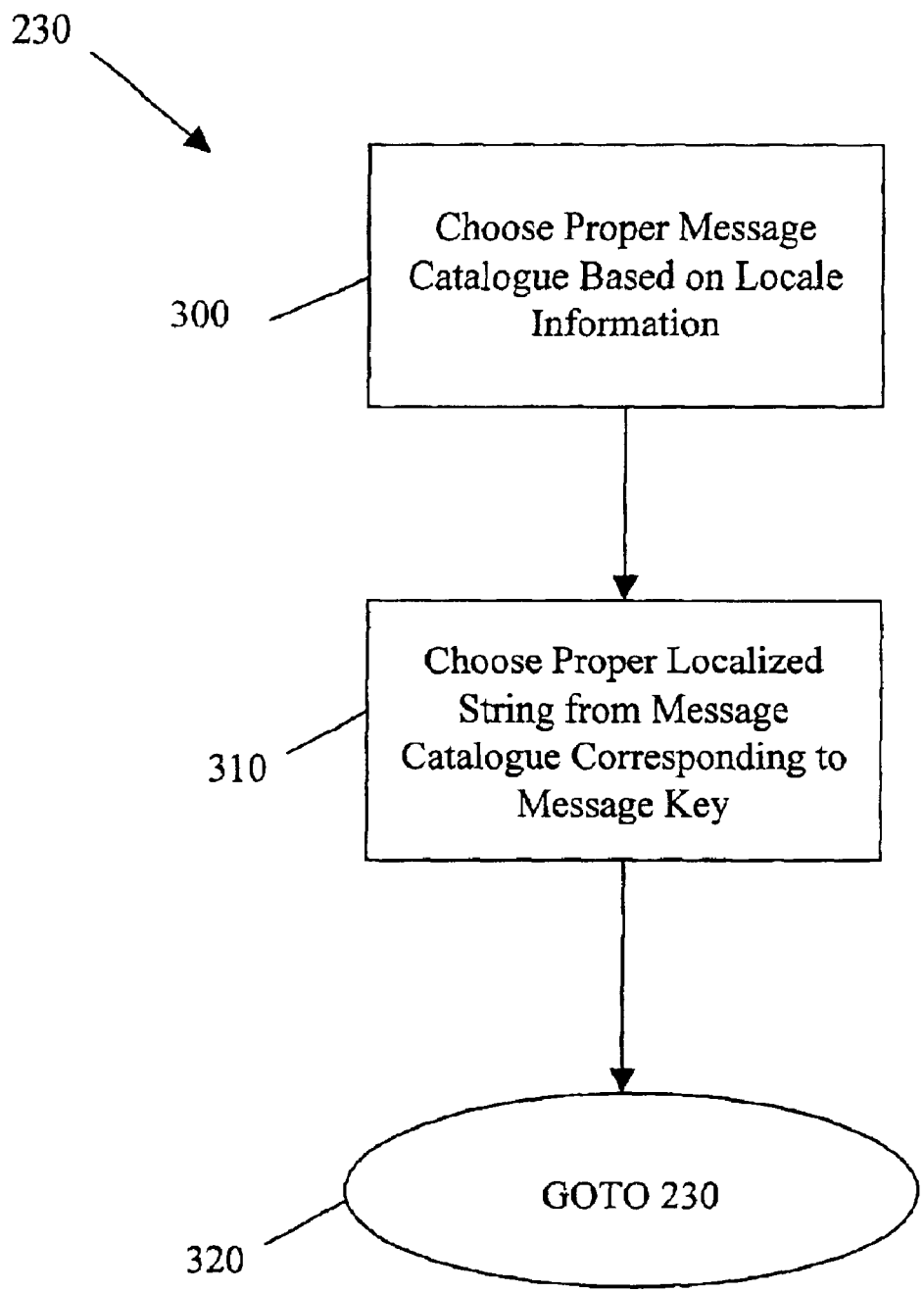
FIG. 4 is a flowchart of a preferred method for retrieving internationalized character strings.

FIG. 4 is a flowchart of a preferred method for retrieving internationalized character strings, denoted generally by reference numeral 230. Internationalization method 230 includes choosing, at step 300, a proper message catalogue 36 and choosing, at step 310, a proper localized string from the message catalogue 36. Internationalization method 230 then returns, at step 320, to display method 150.

Internationalization method 230 chooses, at step 300, the proper message catalogue based on the locale parameter retrieved, at step 120, from the computer system 10 (FIG. 2). The locale parameter is expressed as a country/language pair. For example, the locale parameter for the English language as spoken in the United States would be EN us, whereas the locale parameter for British English would be EN br. The locale parameter corresponds to one of the message catalogue(s) 36 associated with the program 32. A particular message catalogue 36 contains every character string value needed for the program 32, expressed in the language corresponding to the locale parameter. In addition to actual words, the character string may be a time and/or a date. The message catalogue 36 would also contain the time and/or date string formatted for that particular language. For example, most European languages express dates in a day/month/year format rather than the American English month/day/year format. A message catalogue 36 corresponding to a European language would then contain date character strings in the proper day/month/year format.

Once the correct message catalogue 36 has been chosen, internationalization method 230 then chooses, at step 310, the correct character string value from the message catalogue 36 corresponding to the message key that defines the character string under test. The message catalogue contains a plurality of character string values and the message key points to the particular character string in the message catalogue 36 which is to be displayed. Once the correct character string value has been chosen, internationalization method 230 returns, at step 320, to display method 150.

Having described preferred embodiments of a novel method for testing internationalization in a program under development (which are intended to be illustrative and not limiting), note that modifications and variations can be made by persons skilled in the art in light of the above teachings. Therefore, understand that changes may be made in the particular embodiments disclosed which are within the scope and spirit of what is described as defined by the appended claims.

A novel method testing internationalization in a program under development with the details and particularity required by the patent laws being described, what is claimed and desired protected by Letters Patent is set forth in the appended claims.

What is claimed is:

1. A method executing on a computer readable medium for internationalization, testing of a program under development, the method comprising steps of:

determining whether a command from a tester of the program contains a test switch;

initiating the internationalization testing of the program if the command contains the test switch;

determining whether a character string being tested is defined by a message catalogue key, wherein the message catalogue key is a variable that references a particular character string value in a message catalogue, the message catalogue containing character strings expressed in a particular language;

if the character string is defined by a message catalogue key, retrieving a value of the character string from an appropriate message catalogue;

determining whether a mangle switch value is true, wherein the mangle switch value is true if the command contains a test switch; and if the mangle switch value is true, modifying a display of the character string being tested using a mangle algorithm.

2. The method of claim 1, wherein the character string being tested is internationalized if it contains the message catalogue key.

3. The method of claim 2, further comprising the step of:

displaying to the tester the character string being tested as hard-coded when the character string being tested is not defined by the message catalogue key.

4. The method of claim 1, further comprising the steps of:

selecting a message catalogue based on a locale parameter; and retrieving a specific localized character string from a message catalogue using a message catalogue key.

5. The method of claim 4, wherein:

the locale parameter corresponds to a specific language; and a plurality of localized character strings in the message catalogue is expressed in the specific language.

6. The method of claim 5, wherein:

the plurality of localized character strings includes times and dates; and the times and dates are expressed in a format pursuant to the specific language.

7. The method of claim 4, wherein the locale parameter is expressed as a country/language pair.

8. The method of claim 1, wherein the step of modifying the character string being tested further includes:

manipulating letters of the character string being tested such that letters of the character string being displayed are opposite in case from letters of the character string being tested.

9. A computer-readable medium containing modules to control a processor for internationalization testing of a program under development, the modules comprising:

a module to determine whether a command from a tester of the program contains a test switch; the test switch initiating the internationalization testing of the program if the command contains the test switch;

a module to determine whether a character string being tested is defined by a message catalogue key, wherein the message catalogue key is a variable that references a particular character string value in a message catalogue, the message catalogue containing character strings expressed in a particular language;

a module to retrieve a value of the character string from an appropriate message catalogue if the character string is defined by a message catalogue key;

a module to determine whether a mangle switch value is true, wherein the mangle switch value is true if the command contains a test switch; and a module to modify a display of the character string being tested using a mangle algorithm if the mangle switch value is true.

10. The computer-readable medium of claim 9, whereby the character string being tested in internationalized if it contains the message catalogue key.

11. The computer-readable medium of claim 10, further comprising:

a module to display to the tester the character string being tested as hard-coded when the character string being tested is not defined by the message catalogue key.

12. The computer-readable medium of claim 9, further comprising:

a module to select a message catalogue based on a locale parameter; and a module to retrieve a specific localized character string from a message catalogue using the message catalogue key.

13. The computer-readable medium of claim 12, wherein:

the locale corresponds to a specific language; and the plurality of localized character strings in the message catalogue is expressed in the specific language.

14. The computer-readable medium of claim 13, wherein:

the plurality of localized character strings contains times and dates; and the times and dates are in a format pursuant to the specific language.

15. The computer-readable medium of claim 12, wherein the locale parameter is expressed as a country/language pair.

16. The computer-readable medium of claim 9, wherein the module to modify the character string being tested manipulates letters of the character string being tested such that letters of the character string being displayed are opposite in case from letters of the character string being tested.

17. A system executing on a computer readable medium for internationalization testing of a program under development, comprising an input device, a processor, and output device, a first memory to store the program, a second memory to store at least one message catalogue, and a third memory that includes modules to control the processor, the modules comprising:

a module to determine whether a command from a tester of the program contains a test switch; the test switch initiating the internationalization testing of the program if the command contains the test switch;

a module to determine whether a character string being tested is defined by a message catalogue key, wherein the message catalogue key is a variable that references a particular character string value in a message catalogue, the message catalogue containing character strings expressed in a particular language;

a module to retrieve a value of the character string from an appropriate message catalogue if the character string is defined by a message catalogue key;

a module to determine whether a mangle switch value is true, wherein the mangle switch value is true if the command contains a test switch; and a module to modify a display of the character string being tested using a mangle algorithm if the mangle switch value is true, wherein the input device allows a user to input the command containing the test switch for initializing a testing code, wherein the output device displays the character string being tested, and wherein the at least one message catalogue contains a plurality of localized character strings.

* * * * *